United States Patent
Zhang

(10) Patent No.: US 11,882,190 B2
(45) Date of Patent: Jan. 23, 2024

(54) DEVICE LINKAGE METHOD, RULE ENGINE DEVICE, AND CLIENT DEVICE

(71) Applicant: GUANGDONG OPPO MOBILE TELECOMMUNICATIONS CORP., LTD., Guangdong (CN)

(72) Inventor: Jun Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/859,681

(22) Filed: Jul. 7, 2022

(65) Prior Publication Data

US 2023/0037642 A1 Feb. 9, 2023

Related U.S. Application Data

(63) Continuation of application No. PCT/CN2020/071513, filed on Jan. 10, 2020.

(51) Int. Cl.
*H04L 67/141* (2022.01)

(52) U.S. Cl.
CPC .................. *H04L 67/141* (2013.01)

(58) Field of Classification Search
CPC .............. H04L 67/141; H04L 65/1016; H04L 65/1069; H04L 12/2814; H04W 4/50; H04W 4/70; G06F 9/547
See application file for complete search history.

(56) References Cited

U.S. PATENT DOCUMENTS

| | | | |
|---|---|---|---|
| 6,970,840 B1 * | 11/2005 | Yu | G06Q 30/0623 705/26.61 |
| 10,116,661 B2 | 10/2018 | Wang | |
| 11,356,440 B2 * | 6/2022 | Mangalvedkar | H04W 4/50 |
| 2018/0183798 A1 | 6/2018 | Wang et al. | |
| 2018/0351954 A1 | 12/2018 | Wang et al. | |
| 2018/0351955 A1 | 12/2018 | Wang et al. | |
| 2019/0213064 A1 * | 7/2019 | Baier | G06F 9/547 |
| 2019/0349213 A1 | 11/2019 | Shive et al. | |

FOREIGN PATENT DOCUMENTS

| | | |
|---|---|---|
| CN | 106357745 A | 1/2017 |
| CN | 106487922 A | 3/2017 |
| CN | 107343087 A | 11/2017 |

(Continued)

OTHER PUBLICATIONS

Jin et al., "Resource Management Based on OCF for Device Self-Registration and Status Detection in IoT Networks," MDPI, Department of Computer Engineering, Jeju National University, Jeju 63243, Korea, Published: Mar. 11, 2019 (Year: 2019).*

(Continued)

*Primary Examiner* — Alina A Boutah
(74) *Attorney, Agent, or Firm* — Ladas & Parry LLP

(57) ABSTRACT

Provided is a device linkage method, including that: a rule engine device receives a request message of adding a rule input resource instance from a client device; and the rule engine device establishes a connection relationship between the rule engine device and a rule input server device based on the request message of adding the rule input resource instance, the connection relationship being configured to implement device linkage.

8 Claims, 5 Drawing Sheets

(56) References Cited

FOREIGN PATENT DOCUMENTS

WO     WO-2019051028 A1 *   3/2019    ............. G16Y 40/35
WO     WO-2021134252 A1 *   7/2021    ............. G16Y 40/35

OTHER PUBLICATIONS

Michael McCool, "OCF Overview Including Summary of New Features in OCF 1.0 Candidate Draft," Intel, Osaka, W3C Web of Things F2F, May 16, 2017 (Year: 2017).*
International Search Report in the international application No. PCT/CN2020/071513, dated Oct. 13, 2020.
Written Opinion of the International Search Authority in the international application No. PCT/CN2020/071513, dated Oct. 13, 2020.
Samsung et al: "OIC spec", TP-2015-0811-OIC_SPEC.ZIP. ONEM2M, vol. Technical Plenary, TP Sep. 7, 2015 (Sep. 7, 2015), pp. 1-173, XP084001338.
Supplementary European Search Report in the European application No. 20912138.3, dated Nov. 30, 2022.

* cited by examiner

DEVICE LINKAGE METHOD, RULE ENGINE DEVICE, AND CLIENT DEVICE

CROSS-REFERENCE TO RELATED APPLICATION

This is a continuation application of International Patent Application No. PCT/CN2020/071513 filed on Jan. 10, 2020, the disclosure of which is incorporated herein by reference in its entirety.

TECHNICAL FIELD

The disclosure relates to the technical field of information processing, and particularly to a device linkage method, an electronic device, and a storage medium.

BACKGROUND

In related art, an Open Connectivity Foundation (OCF) linkage rule engine may implement linkage between OCF devices. However, there is yet no solution to reduction of the complexity of a linkage mechanism between devices as well as to lowering of requirements for the performance of the linked devices.

SUMMARY

In a first aspect, the embodiments of the disclosure provide a device linkage method, which includes the following operations.

A rule engine device receives a request message of adding a rule input resource instance from a client device, and the rule engine device establishes a connection relationship between the rule engine device and a rule input server device based on the request message of adding the rule input resource instance, the connection relationship being configured to implement device linkage.

In a second aspect, the embodiments of the disclosure provide a device linkage method, which includes the following operation.

A client device sends a request message of adding a rule input resource instance to a rule engine device. The request message of adding the rule input resource instance is configured for the rule engine device to establish a connection relationship between the rule engine device and a rule input server device. The connection relationship is configured to implement device linkage.

In a third aspect, the embodiments of the disclosure provide a rule engine device, which includes a receiving unit and a processing unit.

The receiving unit may be configured to receive a request message of adding a rule input resource instance from a client device.

The processing unit may be configured to establish a connection relationship between the rule engine device and a rule input server device based on the request message of adding the rule input resource instance, the connection relationship being configured to implement device linkage.

In a fourth aspect, the embodiments of the disclosure provide a client device, which may include a sending unit, configured to send a request message of adding a rule input resource instance to a rule engine device.

The request message of adding the rule input resource instance is configured for the rule engine device to establish a connection relationship between the rule engine device and a rule input server device. The connection relationship is configured to implement device linkage.

In a fifth aspect, the embodiments of the disclosure provide a rule engine device, which includes a processor and a memory configured to store a computer program capable of running in the processor. The processor may be configured to run the computer program to execute the operations of the device linkage method executed by the rule engine device.

In a sixth aspect, the embodiments of the disclosure provide a client device, which includes a processor and a memory configured to store a computer program capable of running in the processor. The processor may be configured to run the computer program to execute the operations of the device linkage method executed by the client device.

In a seventh aspect, the embodiments of the disclosure provide a chip, which includes a processor, configured to call, from a memory, and run a computer program to cause a rule engine device installed with the chip to execute the device linkage method.

In an eighth aspect, the embodiments of the disclosure provide a chip, which includes a processor, configured to call, from a memory, and run a computer program to cause a client device installed with the chip to execute the device linkage method.

In a ninth aspect, the embodiments of the disclosure provide a storage medium, which stores an executable program that may be executed by a processor to implement the device linkage method executed by the rule engine device.

In a tenth aspect, the embodiments of the disclosure provide a storage medium, which stores an executable program that may be executed by a processor to implement the device linkage method executed by the client device.

In an eleventh aspect, the embodiments of the disclosure provide a computer program product, which includes a computer program instruction that may cause a computer to implement the device linkage method executed by the rule engine device.

In a twelfth aspect, the embodiments of the disclosure provide a computer program product, which includes a computer program instruction that may cause a computer to implement the device linkage method executed by the client device.

In a thirteenth aspect, the embodiments of the disclosure provide a computer program, which may cause a processor to implement the device linkage method executed by the rule engine device.

In a fourteenth aspect, the embodiments of the disclosure provide a computer program, which may cause a computer to implement the device linkage method executed by the client device.

DETAILED DESCRIPTION

Figure 1:
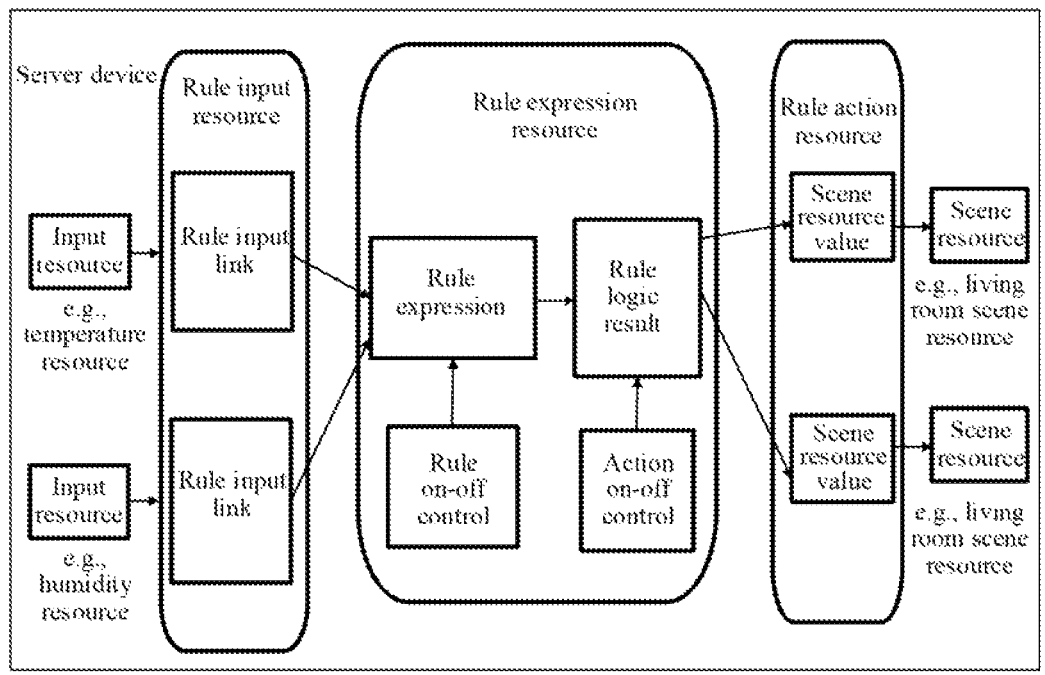
FIG. 1 is a schematic diagram of device linkage according to the disclosure.

In order to understand the characteristics and technical contents of the embodiments of the disclosure in more detail, implementation of the embodiments of the disclosure will be described below in combination with the drawings in detail. The appended drawings are only for description as references and not intended to limit the embodiments of the disclosure.

Before a device linkage method provided in the embodiments of the disclosure is described in detail, terms involved in the embodiments of the disclosure are described first briefly.

1) Resource link represents a reference relationship between OCF resources.

2) Endpoint is a source or destination of a request message and a response message.

3) Server device is an OCF server.

Communication between an OCF device and an OCF server is described briefly hereinafter.

As an emerging Internet of things application-layer technology standard organization, OCF sets up a Restful service framework for interconnection and intercommunication of Internet of things devices. In the OCF Restful service framework, the Internet of things devices, functional service of OCF devices, statuses of OCF devices, and other information are represented by resources. An entity providing a resource is an OCF server device (referred to as a server device hereinafter for short), and an entity accessing a resource is an OCF client (referred to as a client device hereinafter for short).

For example, a control terminal acquiring indoor environmental state data is a client device, and a sensor device monitoring the indoor environmental state data is a server device. Service interaction between the client device and the server device may be implemented by operations on resources, such as creation, reading, updating, deletion, or notification.

In order to represent an association relationship between resources, OCF defines resource links, i.e., resource Links. An OCF server device may provide its own resource in form of a resource link such that an OCF client device discovers the resource of the OCF server device. A content of the resource link is as follows:

```
{
    "anchor": "ocf://dc70373c-1e8d-4fb3-962e-017eaa863989",
    "href": "/myLightSwitch",
    "rt": ["oic.r.switch.binary"],
    "if": ["oic.if.a", "oic.if.baseline"],
}.
```

A content of the resource link includes:

anchor: which represents a context Uniform Resource Identifier (URI), representing a URI of an owner resource including the resource link;

href: which represents a target URI, i.e., a URI of a target resource taken as a reference in the resource link;

rt: which represents a resource type identifier of the target resource; and if: which represents an interface supported by the target resource.

An OCF linkage rule engine may provide a linkage characteristic between different resources in a same server. A user may preset a specific linkage rule to implement automatic operations on different resources in the same server. The linkage rule engine runs in the server bearing the rule related resources as software.

FIG. 1 is a schematic diagram of device linkage according to the disclosure. A linkage rule engine of a server includes the following resources.

1) A rule input resource includes one or more links pointing to the input resource, and an attribute state of the rule input resource is evaluated as a condition of a rule expression. The rule input link includes the following parameters: href, anchor, rel, rt, and if.

href represents a relative URI of a local input resource, residing in a same server as a rule engine. For example, if href is a URI/mytemperaturesensor of a temperature resource, the rule engine may observe a change of the temperature resource in the server.

anchor corresponds to a variable name in the rule expression, and is used to identify the input resource in the rule. For example, the rule expression includes an associated link with a variable "myTemperature: Value", and anchor thereof is set as myTemperature to represent a variable name of the input resource, i.e., the temperature resource, in the rule expression.

rel describes a relationship between href and anchor, and is valued to ruleinput.

rt represents a resource type of the input resource.

if represents a resource interface for observing the input resource inside.

2) A rule action resource includes one or more links pointing to local scene resources whose lastScene attribute values are to be set. When a calculation result of the rule expression is TRUE, the rule engine sets a lastScene attribute value of the scene resource associatively with each scene resource link according to the link pointing to the scene resource executing the rule. The rule action link includes the following parameters: link and lastScene.

link represents the link of the scene resource.

lastScene represents a value which is set at the lastScene value of the scene resource.

It is to be noted that the scene resource is for a scene control function of a server. For example, a user may predefine a scene including multiple target resources, thereby implementing centralized control of the multiple resources. An attribute value of the lastScene attribute of the scene resource represents a certain scene. The lastScene attribute value may be mapped to a resource attribute of the target resource of the server. The lastScene attribute value is changed to change an attribute state of the target resource.

For example, a server may be a light to implement a living room scene resource /livingRoomScene, a light switch resource /lightSwitch, and a light brightness resource /lightBrightness, and the client may configure a lastScene attribute value of the living room scene resource to be associated with a switch attribute of the light switch resource and a brightness attribute of the light brightness resource. When the lastScene attribute value is reading, representing a reading mode, a switch attribute value of the light switch resource is on (representing that the light is on), and a brightness attribute value of the light brightness resource is 1,000. When the lastScene attribute value is watchingTV, representing a TV watching mode, the switch attribute value of the light switch resource is off (representing that the light is off), and the brightness attribute value of the light brightness resource is 100. The lastScene attribute value of the living room scene resource is changed to change on/off and brightness states of the light.

3) The rule engine calculates a rule logic as a Boolean value (TRUE or FALSE) according to the rule logic defined by the rule input. For example, if the rule expression is "mytemperature: value>28", representing that a temperature value is above 28□, the rule logic is calculated as TRUE, and a linkage rule condition is satisfied.

The rule expression further includes rule on-off control and action on-off control, values of which may be a Boolean value TRUE or FALSE. The rule logic is valid only when rule on-off control is TRUE, and the rule action is valid only when action on-off control is TRUE. For example, in a linkage rule instance, a rule input observes a temperature resource in a server, a rule engine evaluates whether a change of a temperature value satisfies a linkage action condition only when rule on-off control is TRUE, and if a calculation result of a rule logic is TRUE, the rule engine triggers a rule action only when action on-off control is TRUE.

In the linkage rule engine, the rule action resource points to a scene resource. That is, a scene resource is required by device linkage. Compared with controlling a target resource through a scene resource, directly controlling the target resource is more complex in setting and control, so that it is highly complex in related art to set device linkage. Moreover, a server device supporting scene resources needs to have an additional device capability (storage, calculation, etc.), an Internet of things device extremely limited in resource is limited in resource capability and may be unable to support scene resources, and furthermore, linkage rules may not be supported, so that user experiences are degraded.

The disclosure provides a device linkage method. The device linkage method of the embodiments of the disclosure may be applied to various communication systems, such as a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a Wireless-Fidelity (Wi-Fi) system, a Bluetooth communication system, or a 5th-Generation (5G) system.

Figure 2:
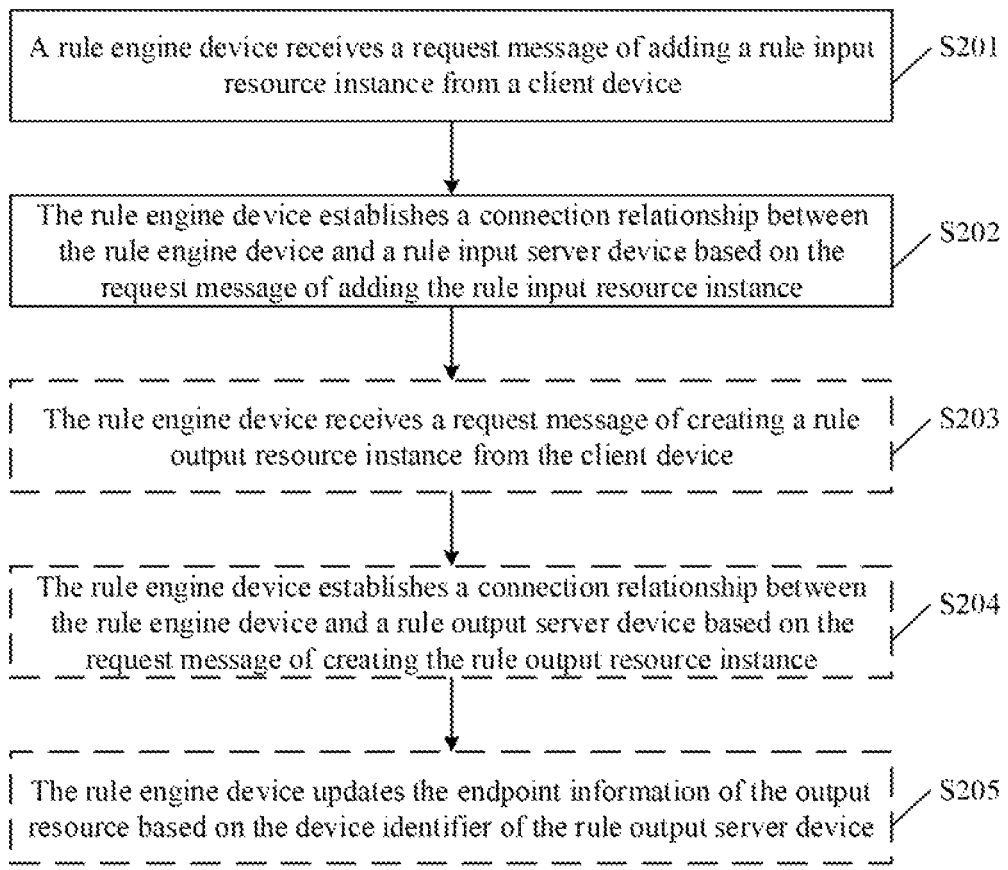
FIG. 2 is an optional processing flowchart of a device linkage method applied to a rule engine device according to an embodiment of the disclosure.

FIG. 2 shows an optional processing flow of a device linkage method applied to a rule engine device according to an embodiment of the disclosure, including the following operations.

In S201, a rule engine device receives a request message of adding a rule input resource instance from a client device.

In the embodiment of the disclosure, the rule input resource instance may be expressed as:

```
{
"di":"dc70373c-1e8d-4fb3-962e-017eaa863989",
"links":[
{
"anchor":"mytemperature",
"href":"/mytemperaturesensor",
"rel": ["ruleinput"],
```

-continued

```
"rt": ["oic.r.temperature"],
"if": ["oic.if.a","oic.if.baseline"],
"eps":["ep":"coaps://[fe80::b1d7]:1123"]
}
]
}.
```

The rule input resource may include the following contents: di and links.

di is a device identifier of a rule input server device.

links represents one or more input resource links, specifically including the following information: anchor, href, rel, rt, if, and eps.

anchor corresponds to a variable name in a rule expression, and may be a resource name of the input resource.

href represents a URI of the input resource.

rel describes a relationship between href and anchor, and is valued to ruleinput.

rt represents a resource type of the input resource.

if represents a resource interface for observing the input resource.

eps represents endpoint information of the input resource.

In some embodiments, the request message of adding the rule input resource instance may include a device identifier of a rule input server device, a variable name of an input resource, and a relative URI of the input resource. The request message of adding the rule input resource instance may further include endpoint information of the input resource. The endpoint information of the input resource may be directly contained in the request message of adding the rule input resource instance. Alternatively, the endpoint information of the input resource may be determined by the rule engine device based on the device identifier of the rule input server end.

In some other embodiments, the request message of adding the rule input resource instance may include a variable name of an input resource and an absolute URI of the input resource. The absolute URI of the input resource may include a device identifier of the rule input server device and/or endpoint information of the input resource. For example, the URI of the input resource may be ocf:// dc70373c-1e8d-4fb3-962e-017eaa863989/mytemperaturesensor, where the device identifier is dc70373c-1e8d-4fb3-962e-017eaa863989. For another example, the URI of the input resource may be coap://[fe80:bld6]:1111/mytemperaturesensor, where a resource endpoint is coap://[fe80:bld6]:1111.

During specific implementation, the endpoint information of the input resource may also be determined by the rule engine device based on the device identifier of the rule input server device. For example, the rule engine device may obtain a corresponding endpoint of the input resource based on the device identifier by performing Domain Name System (DNS) parsing or by querying a device identifier and resource endpoint mapping database.

In the embodiment of the disclosure, the rule engine device may directly access the input resource of the rule input server device based on the endpoint information of the input resource. The device identifier of the rule input server device is used to identify the rule input server device. Moreover, the device identifier of the rule input server device may also be used for subsequent device data statistical analysis (for example, the number of linkage rules that are set in the specific server device may be statistically obtained based on the device identifier of the rule input server device). For example, when the rule input server device is powered on after being powered off, an endpoint thereof may change. However, since URIs of resources of different rule input server devices may be the same, the specific rule input server device may not be recognized according to URIs of resources and/or resource endpoints. However, the device identifier remains unchanged, so that the rule input server device may be recognized uniquely based on the device identifier of the rule input server device.

In S202, the rule engine device establishes a connection relationship between the rule engine device and a rule input server device based on the request message of adding the rule input resource instance.

In some embodiments, the rule engine device may establish the connection relationship between the rule engine device and the rule input server device based on the endpoint information of the input resource in the request message of adding the rule input resource instance.

After establishing the connection relationship between the rule engine device and the rule input server device, the rule engine device may subscribe to a target resource of the rule input server device based on the endpoint information of the input resource and the URI of the input resource. Moreover, in case that the endpoint information of the input resource changes, the rule engine device may update the endpoint information of the input resource based on the device identifier of the rule input server device.

In some optional embodiments, the device linkage method applied to the rule engine device may further include the following operation.

In S203, the rule engine device receives a request message of creating a rule output resource instance from the client device.

In the embodiment of the disclosure, the rule output resource instance may be expressed as:

```
{
"di":"e61c3e6b-9c54-4b81-8ce5-f9039c1d04d9",
"actions":[
{
"href":"/binaryswitch",
"rt": ["oic.r.binaryswitch"],
"if": ["oic.if.a","oic.if.baseline"],
"eps":["ep":"coaps://[fe80::b1d7]:1123"],
"property":"value",
"value":true
}
]
}.
```

The rule output resource may include the following contents: di and actions.

di is a device identifier of a rule output server.

actions represents one or more output resources, specifically including the following information: href, rt, if, eps, property, and value.

href represents a URI of the output resource.

rt represents a resource type of the output resource.

if represents a resource interface for observing the output resource.

eps represents an endpoint of the output resource.

property represents an attribute name of the output resource.

value represents an attribute value of the output resource.

In some embodiments, the request message of creating the rule output resource instance may include a device identifier of a rule output server device, an attribute name of an output resource, an attribute value of the output resource, and a relative URI of the output resource. The request message of creating the rule output resource instance may further include endpoint information of the output resource. The endpoint information of the output resource may be directly contained in the request message of creating the rule output resource instance. Alternatively, the endpoint information of the output resource may be determined by the rule engine device based on the device identifier of the rule output server end.

In some other embodiments, the request message of creating the rule output resource instance may include an attribute name of an output resource, an attribute value of the output resource, and an absolute URI of the output resource. The absolute URI of the output resource may include a device identifier of a rule output server device and/or endpoint information of the output resource. For example, the URI of the output resource may be ocf://dc70373c-1e8d-4fb3-962e-017eaa863990/mylightswitch, where the device identifier is dc70373c-1e8d-4fb3-962e-017eaa863990. For another example, the URI of the output resource may be coap://[fe80:bld7]:1122/mylightswitch, where a resource endpoint is coap://[fe80:bld7]:1122.

During specific implementation, the endpoint information of the output resource may also be determined by the rule engine device based on the device identifier of the rule output server device. For example, the rule engine device obtains a corresponding endpoint of the input resource based on the device identifier by performing DNS parsing or querying a device identifier and resource endpoint mapping database.

In the embodiment of the disclosure, the rule engine device may directly access the output resource of the rule output server device based on an endpoint of the output resource. The device identifier of the rule output server device is used to identify the rule output server device. Moreover, the device identifier of the rule output server device may also be used for subsequent device data statistical analysis (for example, the number of linkage rules set in the specific server may be statistically obtained based on the device identifier of the rule output server device). For example, when the rule output server device is powered on again after being powered off, an endpoint thereof may change. However, since URIs of resources of different rule output server devices may be the same, the specific rule output server device may not be recognized according to URIs of resources and/or resource endpoints. However, the device identifier remains unchanged, so that the rule output server device may be recognized uniquely based on the device identifier of the rule output server device.

In some optional embodiments, the device linkage method applied to the rule engine device may further include the following operation.

In S204, the rule engine device establishes a connection relationship between the rule engine device and a rule output server device based on the request message of creating the rule output resource instance.

In some embodiments, the rule engine device establishes the connection relationship between the rule engine device and the rule output server device based on the endpoint information of the output resource in the request message of creating the rule output resource instance. After establishing the connection relationship between the rule engine device and the rule output server device, the rule engine device may update a target resource of the rule output server device based on the endpoint information of the output resource and the URI of the output resource. The target resource of the rule output server device includes an attribute name of the target resource and an attribute value of the target resource.

In case that the endpoint information of the output resource changes, the method may further include the following operation.

In S205, the rule engine device updates the endpoint information of the output resource based on the device identifier of the rule output server device.

Figure 3:
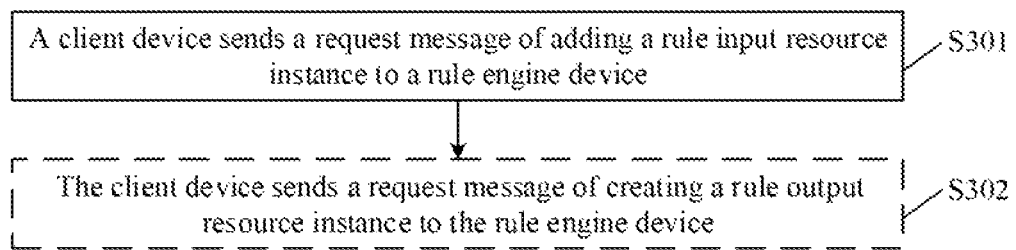
FIG. 3 is an optional processing flowchart of a device linkage method applied to a client device according to an embodiment of the disclosure.

FIG. 3 shows an optional processing flow of a device linkage method applied to a client device according to an embodiment of the disclosure, including the following operations.

In S301, a client device sends a request message of adding a rule input resource instance to a rule engine device.

It is to be noted that descriptions about the request message of adding the rule input resource instance in the embodiment of the disclosure are the same as those about the request message of adding the rule input resource instance in S201, and elaborations are omitted herein.

In some optional embodiments, the device linkage method applied to the client device may further include the following operation.

In S302, the client device sends a request message of creating a rule output resource instance to the rule engine device.

It is to be noted that descriptions about the request message of creating the rule output resource instance in the embodiment of the disclosure are the same as those about the request message of creating the rule output resource instance in S203, and elaborations are omitted herein.

Figure 4:
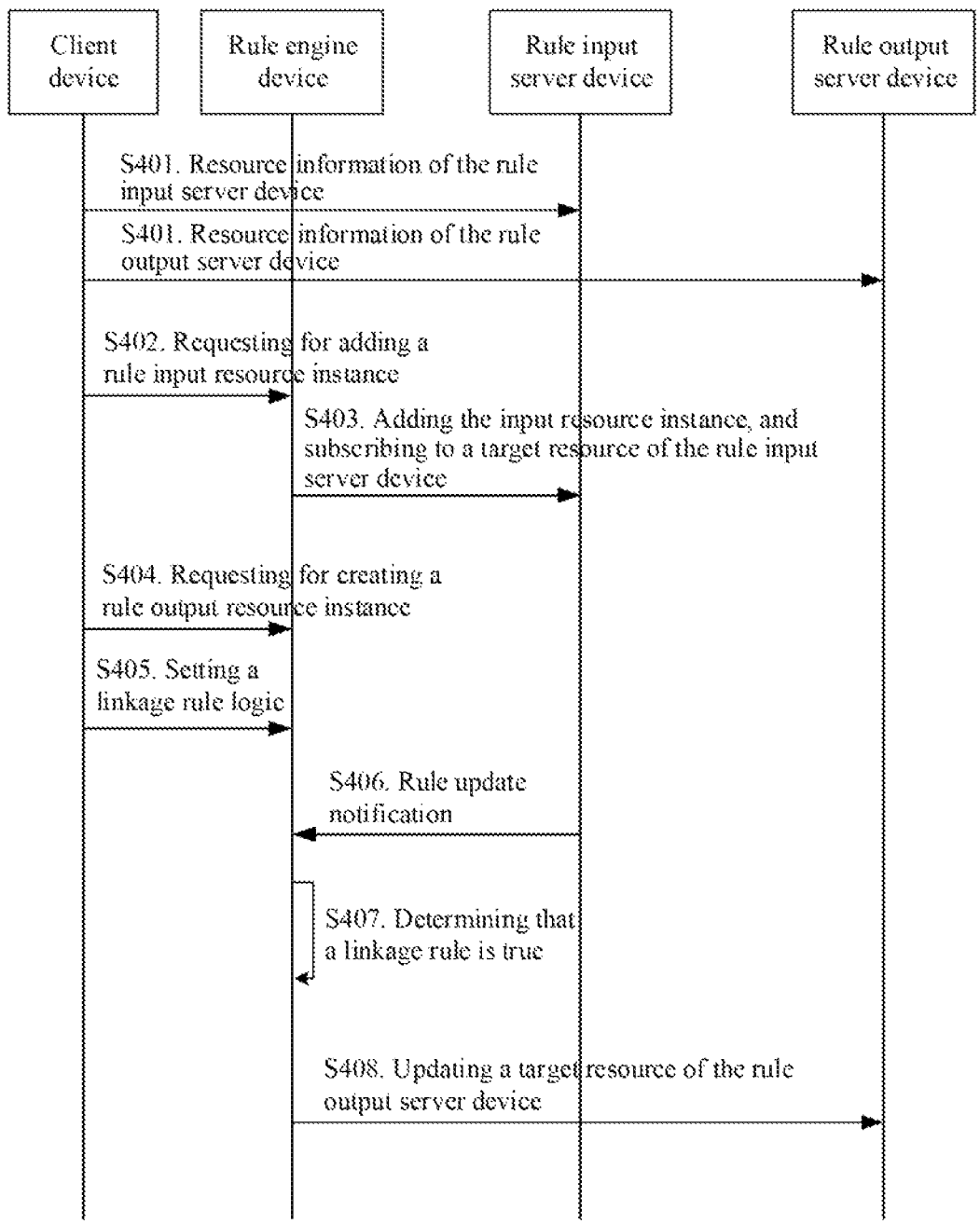
FIG. 4 is a detailed processing flowchart of a device linkage method according to an embodiment of the disclosure.

For the device linkage methods shown in FIG. 2 and FIG. 3, FIG. 4 shows a detailed processing flow of a device linkage method according to an embodiment of the disclosure, including the following operations.

In S401, a client device triggers creation of a device linkage rule, and the client device acquires resource information of a rule input server device and resource information of a rule output server device by an OCF local communication or remote communication process.

In S402, the client device requests a rule engine device for adding a rule input resource instance.

In S403, the rule engine device establishes a connection relationship between the rule engine device and the rule input server device, adds the input resource instance to a rule input resource, and subscribes to a target resource of the rule input server device based on an endpoint of the input resource and a URI of the resource.

In S404, the client device requests the rule engine device for creating a rule output resource instance.

In S405, the client device sets a linkage rule logic through a rule expression.

In S406, the client device receives a resource update notification of the rule input server device.

In S407, the rule engine device determines that a linkage rule is true.

In S408, the rule engine device updates a target resource of the rule output server device based on an endpoint of an output resource and a URI of the output resource.

It is to be noted that the device linkage method in the embodiment of the disclosure may be implemented cooperatively by the client device, the rule engine device, the rule input server device, and the rule output server device. The client device, the rule engine device, the rule input server device, and the rule output server device may be located on different devices or on the same device. The rule input server device is a server device triggering the linkage rule, and the rule output server device is a server device for control when the linkage rule goes into effect.

It is to be understood that, in various embodiments of the disclosure, the magnitude of the sequence number of each process does not mean an execution sequence and the execution sequence of each process should be determined by its function and an internal logic and should not form any limitation on the implementation of the embodiments of the disclosure.

According to the device linkage method provided in the embodiments, a rule engine device receives a request message of adding a rule input resource instance from a client device, the rule engine device establishes a connection relationship between the rule engine device and a rule input server device based on the request message of adding the rule input resource instance, the connection relationship being configured to implement device linkage. In this manner, resources involved during device linkage need not to be directed to scene resources, so that device linkage may be implemented independent of scene resources, and the complexity of a device linkage mechanism is reduced. Moreover, resources involved during device linkage need not to be directed to scene resources, so that a server device needs not to have an additional calculation or storage capability, etc., requirements for the performance of linked devices are lowered, and device linkage can be implemented more easily.

Figure 5:
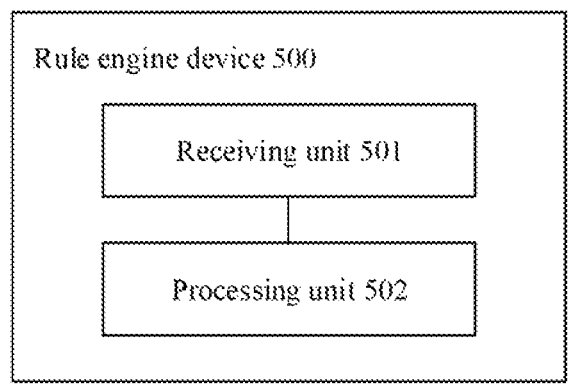
FIG. 5 is a composition diagram of a rule engine device according to an embodiment of the disclosure.

In order to implement the device linkage method, an embodiment of the disclosure provides a rule engine device. A composition of the rule engine device 500, as shown in FIG. 5, includes a receiving unit 501 and a processing unit 502.

The receiving unit 501 is configured to receive a request message of adding a rule input resource instance from a client device.

The processing unit 502 is configured to establish a connection relationship between the rule engine device and a rule input server device based on the request message of adding the rule input resource instance 502, the connection relationship being configured to implement device linkage.

In some embodiments, the request message of adding the rule input resource instance may include a device identifier of the rule input server device, a variable name of an input a URI, and a relative URI of the input resource.

In some embodiments, the request message of adding the rule input resource instance further may include endpoint information of the input resource.

In some embodiments, the processing unit 502 may be further configured to determine endpoint information of the input resource based on the device identifier of the rule input server device.

In some embodiments, the request message of adding the rule input resource instance may include a variable name of an input resource and an absolute URI of the input resource.

In some embodiments, the absolute URI of the input resource may include a device identifier of the rule input server device and/or endpoint information of the output resource.

In some embodiments, the processing unit 502 may be configured to establish the connection relationship between the rule engine device and the rule input server device based on the endpoint information of the input resource in the request message of adding the rule input resource instance.

In some embodiments, the processing unit 502 may be further configured to subscribe to a target resource of the rule input server device based on the endpoint information of the input resource and the URI of the input resource.

In some embodiments, the processing unit 502 may be further configured to update the endpoint information of the input resource based on the device identifier of the rule input server device.

In some embodiments, the receiving unit 501 may be further configured to receive a request message of creating a rule output resource instance from the client device.

In some embodiments, the request message of creating the rule output resource instance may include a device identifier of a rule output server device, an attribute name of an output resource, an attribute value of the output resource, and a relative URI of the output resource.

In some embodiments, the request message of creating the rule output resource instance further may include endpoint information of the output resource.

In some embodiments, the processing unit 502 may be further configured to determine endpoint information of the output resource based on the device identifier of the rule output server device.

In some other embodiments, the request message of creating the rule output resource instance may include an attribute name of an output resource, an attribute value of the output resource, and an absolute URI of the output resource.

In some embodiments, the absolute URI of the output resource may include a device identifier of a rule output server device and/or endpoint information of the output resource.

In some embodiments, the processing unit 502 may be configured to, in case that a linkage rule configured by the client device is true, establish a connection relationship between the rule engine device and a rule output server device based on the request message of creating the rule output resource instance.

In some embodiments, the processing unit 502 may be configured to establish the connection relationship between the rule engine device and the rule output server device based on the endpoint information of the output resource in the request message of creating the rule output resource instance.

In some embodiments, the processing unit 502 may be further configured to update a target resource of the rule output server device based on the endpoint information of the output resource and the URI of the output resource.

In some embodiments, the target resource of the rule output server device may include an attribute name of the target resource and an attribute value of the target resource.

In some embodiments, the processing unit 502 may be further configured to update the endpoint information of the output resource based on the device identifier of the rule output server device.

Figure 6:
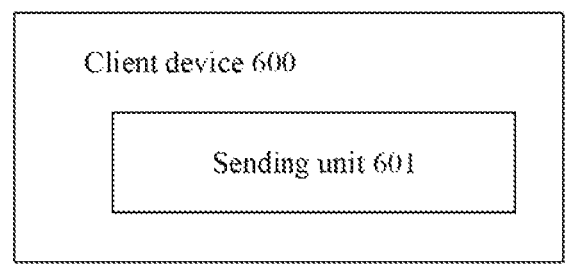
FIG. 6 is a composition diagram of a client device according to an embodiment of the disclosure.

In order to implement the device linkage method, an embodiment of the disclosure provides a client device. A composition of the client device 600, as shown in FIG. 6, includes a sending unit 601.

The sending unit 601 is configured to send a request message of adding a rule input resource instance to a rule engine device.

The request message of adding the rule input resource instance is configured for the rule engine device to establish a connection relationship between the rule engine device and a rule input server device. The connection relationship is configured to implement device linkage.

In some embodiments, the request message of adding the rule input resource instance may include a device identifier of the rule input server device, a variable name of an input a URI, and a relative URI of the input resource.

In some embodiments, the request message of adding the rule input resource instance further may include endpoint information of the input resource.

In some embodiments, the request message of adding the rule input resource instance may include a variable name of an input resource and an absolute URI of the input resource.

In some embodiments, the absolute URI of the input resource may include a device identifier of the rule input server device and/or endpoint information of the output resource.

In some embodiments, the sending unit 601 may be further configured to send a request message of creating a rule output resource instance to the rule engine device.

In some embodiments, the request message of creating the rule output resource instance may include a device identifier of a rule output server device, an attribute name of an output resource, an attribute value of the output resource, and a relative URI of the output resource.

In some embodiments, the request message of creating the rule output resource instance further may include endpoint information of the output resource.

In some other embodiments, the request message of creating the rule output resource instance may include an attribute name of an output resource, an attribute value of the output resource, and an absolute URI of the output resource.

In some embodiments, the absolute URI of the output resource may include a device identifier of a rule output server device and/or endpoint information of the output resource.

The embodiments of the disclosure also provide a rule engine device, which includes a processor and a memory configured to store a computer program capable of running in the processor. The processor is configured to run the computer program to execute the operations of the device linkage method executed by the rule engine device.

The embodiments of the disclosure also provide a client device, which includes a processor and a memory configured to store a computer program capable of running in the processor. The processor is configured to run the computer program to execute the operations of the device linkage method executed by the client device.

The embodiments of the disclosure also provide a storage medium, which stores an executable program that is executed by a processor to implement the device linkage method executed by the rule engine device.

The embodiments of the disclosure also provide a storage medium, which stores an executable program that is executed by a processor to implement the device linkage method executed by the client device.

The embodiments of the disclosure also provide a chip, which includes a processor, configured to call, from a memory, and run a computer program to cause a rule engine device installed with the chip to implement the device linkage method executed by the rule engine device.

The embodiments of the disclosure also provide a chip, which includes a processor, configured to call, from a memory, and run a computer program to cause a client device installed with the chip to implement the device linkage method executed by the client device.

The embodiments of the disclosure also provide a computer program product, which includes a computer program instruction that causes a computer to implement the device linkage method executed by the rule engine device.

The embodiments of the disclosure also provide a computer program product, which includes a computer program instruction that causes a computer to implement the device linkage method executed by the client device.

The embodiments of the disclosure also provide a computer program, which causes a processor to implement the device linkage method executed by the rule engine device.

The embodiments of the disclosure also provide a computer program, which causes a computer to implement the device linkage method executed by the client device.

Figure 7:
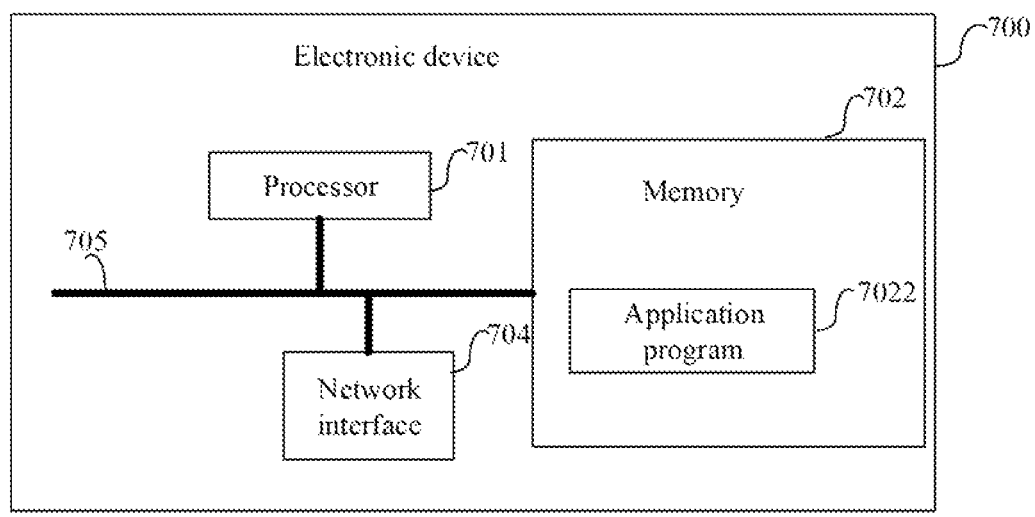
FIG. 7 is a hardware composition diagram of an electronic device according to an embodiment of the disclosure.

FIG. 7 is a hardware composition diagram of an electronic device (a rule engine device and a client device) according to an embodiment of the disclosure. The electronic device 700 includes at least one processor 701, a memory 702, and at least one network interface 704. Each component in the electronic device 700 is coupled together through a bus system 705. It can be understood that the bus system 705 is configured to implement connections and communications between these components. The bus system 705 includes a data bus, and further includes a power bus, a control bus, and a state signal bus. However, for clarity of description, various buses in FIG. 7 are marked as the bus system 705.

It can be understood that the memory 702 may be a volatile memory or a nonvolatile memory, or may include both volatile and nonvolatile memories. The nonvolatile memory may be a Read-Only Memory (ROM), a Programmable ROM (PROM), an Erasable PROM (EPROM), an Electrically EPROM (EEPROM), a Ferromagnetic Random Access Memory (FRAM), a flash memory, a magnetic surface memory, an optical disk, or a Compact Disc ROM (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be used, such as a Static RAM (SRAM), a Synchronous SRAM (SSRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DR RAM). The memory 702 described in the embodiment of the disclosure is intended to include, but not limited to, these and any other proper type of memories.

The memory 702 in the embodiment of the disclosure is configured to store various types of data so as to support operations of the electronic device 700. Examples of the data include any computer program operated in the electronic device 700, such as an application program 7022. A program implementing the method of the embodiment of the disclosure may be included in the application program 7022.

The method disclosed in the embodiments of the disclosure may be applied to the processor 701 or implemented by the processor 701. The processor 701 may be an integrated circuit chip with a signal processing capability. During implementation, each operation of the method may be completed by a hardware integrated logic circuit in the processor 701 or an instruction in a software form. The processor 701 may be a general-purpose processor, a Digital Signal Processor (DSP), another Programmable Logic Device (PLD), discrete gate or transistor logical device, and discrete hardware component, etc. The processor 701 may implement or execute each method, operation, and logical block diagram disclosed in the embodiments of the disclosure. The general-purpose processor may be a Micro Processor Unit (MPU), or any conventional processor, etc. The operations of the method disclosed in combination with the embodiments of the disclosure may be directly embodied to be executed by a hardware decoding processor or executed by a combination of hardware and software modules in the decoding processor. The software module may be located in a storage medium. The storage medium is located in the memory 702. The processor 701 reads information in the memory 702 and completes the operations of the method in combination with hardware.

In an exemplary embodiment, the electronic device 700 may be implemented by one or more Application Specific Integrated Circuits (ASICs), DSPs, PLDs, Complex PLDs (CPLDs), Field Programmable Gate Arrays (FPGAs), general-purpose processors, controllers, Micro Controller Units (MCUs), MPUs, or other electronic components, and is configured to execute the above-mentioned method.

The disclosure is described with reference to the flowcharts and/or block diagrams of the method, device (system), and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a general-purpose computer, a special-purpose computer, an embedded processor, or a processor of another programmable data processing device to generate a machine, so that a device configured to realize functions specified in one or more flows in the flowcharts and/or one or more blocks in the block diagrams is generated by the instructions executed by the computer or the processor of the other programmable data processing device.

Alternatively, these computer program instructions may be stored in a computer-readable memory capable of guiding the computer or the other programmable data processing device to work in a specific manner, so that a product including an instruction device may be generated by the instructions stored in the computer-readable memory, the instruction device realizing the functions specified in one or more flows in the flowcharts and/or one or more blocks in the block diagrams.

Alternatively, these computer program instructions may be loaded to the computer or the other programmable data processing device, so that a series of operating operations are executed on the computer or the other programmable data processing device to generate processing implemented by the computer, and operations for realizing the functions specified in one or more flows in the flowcharts and/or one or more blocks in the block diagrams are provided by the instructions executed in the computer or the other programmable data processing device.

The above is only the preferred embodiment of the disclosure and not intended to limit the scope of protection of the disclosure. Any modifications, equivalent replacements, improvements, etc., made within the spirit and principle of the disclosure shall fall within the scope of protection of the disclosure.

The invention claimed is:

1. A device linkage method, comprising:
receiving, by a rule engine device, a request message of adding a rule input resource instance from a client device, and
establishing, by the rule engine device, a connection relationship between the rule engine device and a rule input server device based on the request message of adding the rule input resource instance, the connection relationship being configured to implement device linkage,
wherein the request message of adding the rule input resource instance comprises:

a device identifier of the rule input server device, a variable name of an input resource, and a relative Unified Resource Identifier (URI) of the input resource.

2. The method of claim 1, wherein the request message of adding the rule input resource instance further comprises endpoint information of the input resource.

3. A device linkage method, comprising:
sending, by a client device, a request message of adding a rule input resource instance to a rule engine device,
wherein the request message of adding the rule input resource instance is configured for the rule engine device to establish a connection relationship between the rule engine device and a rule input server device, and the connection relationship is configured to implement device linkage,
wherein the request message of adding the rule input resource instance comprises:
a device identifier of the rule input server device, a variable name of an input resource, and a relative Unified Resource identifier (URI) of the input resource.

4. The method of claim 3, wherein the request message of adding the rule input resource instance further comprises endpoint information of the input resource.

5. A client device, comprising a processor and a memory configured to store a computer program capable of running in the processor,
wherein the processor is configured to run the computer program to execute the operations of the device linkage method of claim 3.

6. The client device of claim 5, wherein the request message of adding the rule input resource instance further comprises endpoint information of the input resource.

7. A rule engine device, comprising:
a processor,
a network interface, connected with the processors and configured to receive and transmit information under control of the processor,
wherein the network interface is configured to receive a request message of adding a rule input resource instance from a client device; and
the processor is configured to establish a connection relationship between the rule engine device and a rule input server device based on the request message of adding the rule input resource instance, the connection relationship being configured to implement device linkage,
wherein the request message of adding the rule input resource instance comprises:
a device identifier of the rule input server device, a variable name of an input resource, and a relative Unified Resource Identifier (URI) of the input resource.

8. The rule engine device of claim 7, wherein the request message of adding the rule input resource instance further comprises endpoint information of the input resource.

* * * * *